(12) United States Patent
Lee

(10) Patent No.: US 9,919,577 B2
(45) Date of Patent: Mar. 20, 2018

(54) AIR-CONDITIONING DEVICE FOR VEHICLE

(71) Applicant: HYUNDAI MOTOR COMPANY, Seoul (KR)

(72) Inventor: Keun Bok Lee, Jeonju-si (KR)

(73) Assignee: Hyundai Motor Company, Seoul (KR)

(*) Notice: Subject to any disclaimer, the term of this patent is extended or adjusted under 35 U.S.C. 154(b) by 289 days.

(21) Appl. No.: 14/663,234

(22) Filed: Mar. 19, 2015

(65) Prior Publication Data

US 2016/0137025 A1 May 19, 2016

(30) Foreign Application Priority Data

Nov. 14, 2014 (KR) .................. 10-2014-0158625

(51) Int. Cl.
| | |
|---|---|
| *F25B 39/02* | (2006.01) |
| *F25B 5/00* | (2006.01) |
| *F16K 11/20* | (2006.01) |
| *B60H 1/00* | (2006.01) |
| *B60H 1/32* | (2006.01) |

(52) U.S. Cl.
CPC ..... *B60H 1/00371* (2013.01); *B60H 1/00564* (2013.01); *B60H 1/00885* (2013.01); *B60H 1/323* (2013.01); *B60H 2001/00235* (2013.01); *F25B 2313/0233* (2013.01); *F25B 2400/0409* (2013.01); *F25B 2600/2511* (2013.01); *Y10T 137/87249* (2015.04)

(58) Field of Classification Search
CPC ............ B60H 1/00371; B60H 1/00885; B60H 1/323; B60H 2001/00235; B60H 1/00571; F25B 2700/173; F25B 2313/233; F25B 2400/0409; F25B 2600/2511; Y10T 137/8782; Y10T 137/87249; Y10T 137/86839
USPC ......... 62/239, 244, 515, 524, 525, 199, 200, 62/504; 137/625.43, 597, 876
See application file for complete search history.

(56) References Cited

U.S. PATENT DOCUMENTS

| | | | | | |
|---|---|---|---|---|---|
| 4,201,064 | A | * | 5/1980 | Krug ................. | B60H 1/00371 62/239 |
| 4,727,728 | A | * | 3/1988 | Brown .............. | B60H 1/00371 312/257.1 |

(Continued)

FOREIGN PATENT DOCUMENTS

| | | | | |
|---|---|---|---|---|
| JP | 9-175141 A | | 7/1997 | |
| JP | 2004338447 A | * | 12/2004 | ......... B60H 1/00735 |

(Continued)

OTHER PUBLICATIONS

Korean Office Action issued in Korean Application No. 10-2014-0158625 dated Sep. 16, 2015.

*Primary Examiner* — Frantz Jules
*Assistant Examiner* — Daniel C Comings
(74) *Attorney, Agent, or Firm* — McDermott Will & Emery LLP

(57) ABSTRACT

An air-conditioning device for a vehicle includes a first evaporator and a second evaporator provided on a vehicle roof in a longitudinal direction of the vehicle. A refrigerant distributor is provided at a portion at which a refrigerant is supplied to the first evaporator and the second evaporator. The refrigerant distributor is operated to introduce the refrigerant selectively into the first evaporator and the second evaporator.

7 Claims, 6 Drawing Sheets

(56) References Cited

U.S. PATENT DOCUMENTS

| | | | |
|---|---|---|---|
| 7,219,511 B2* | 5/2007 | Inaba | F28D 1/0333 |
| | | | 165/153 |
| 2002/0043073 A1* | 4/2002 | Park | F25B 5/00 |
| | | | 62/231 |

FOREIGN PATENT DOCUMENTS

| | | |
|---|---|---|
| JP | 2013-234801 A | 11/2013 |
| KR | 10-2002-0047972 A | 6/2002 |
| KR | 10-2008-0039073 A | 5/2008 |
| KR | 10-2012-0082518 A | 7/2012 |
| KR | 10-2012-0113070 A | 10/2012 |

* cited by examiner

-- Related Art --

-- Related Art --

AIR-CONDITIONING DEVICE FOR VEHICLE

CROSS-REFERENCE(S) TO RELATED APPLICATIONS

The present application claims the benefit of priority to Korean Patent Application Number 10-2014-0158625 filed on Nov. 14, 2014, the entire contents of which application are incorporated herein for all purposes by this reference.

TECHNICAL FIELD

The present disclosure relates to an air-conditioning device for a vehicle, more particularly, to an air-conditioning device for a vehicle, which delivers a refrigerant selectively into evaporators disposed at a front area and a rear area of a vehicle interior to cool the vehicle interior selectively.

BACKGROUND

A conventional air-conditioning system comprises a compressor for compressing and delivering a refrigerant for a refrigerating cycle. A condenser condenses the high-pressure refrigerant delivered from the compressor. An expansion valve throttles the refrigerant condensed and liquefied in the condenser. An evaporator heat-exchanges the low-pressure liquefied refrigerant throttled by the expansion valve with air blowing into interior of a vehicle and evaporates the refrigerant to cool the air blowing into the vehicle through a heat absorption action caused by evaporation latent heat of refrigerant. Refrigerant pipes connect the above listed elements.

FIGS. 1A and 1B illustrate a structure of a roof-on type air conditioner for a bus. A discharging process of cooled air is described with reference to a circulation flow of refrigerant in the air-conditioning system as below. If a static pressure is generated in an evaporator motor, air inside the vehicle is introduced into an evaporator core 1, and a liquid-phase refrigerant flowing in the evaporator core 1 absorbs heat from the interior of the vehicle air and becomes a gaseous state.

Thus, air passing through the evaporator becomes cold, and the cooled air can be supplied inside an entire space of the vehicle through a flow passage in an air conditioner duct 2.

In above conventional air conditioner, however, when the air conditioner is operated, the refrigerant flows in the entire evaporator core regardless existence of a passenger and whether or not the passenger is on a specific area inside the vehicle, thus increasing power loss of an engine and deteriorating fuel efficiency.

The above structure described as the background art is provided for only understanding the background of the present disclosure, however it should not be accepted that the inventor recognizes that the present invention corresponds to the conventional art which has been already well-known to one having an ordinary skill in the art.

SUMMARY OF THE INVENTION

The present disclosure is devised to solve the above problems of the prior art as described above. An aspect of the present inventive concept provides an air-conditioning device for a vehicle, which delivers a refrigerant selectively into evaporators disposed at a front area and a rear area of a vehicle interior, respectively, to selectively cool the vehicle interior.

According to an exemplary embodiment of the present inventive concept, an air-conditioning device for a vehicle includes a first evaporator and a second evaporator provided on a vehicle roof in a longitudinal direction of the vehicle. A refrigerant distributor is provided at a portion at which a refrigerant is supplied to the first evaporator and the second evaporator. The refrigerant distributor is operated to introduce the refrigerant selectively into the first evaporator and the second evaporator.

The first evaporator and the second evaporator are provided at left and right sides of the roof, respectively, and upper portions of the first evaporator and the second evaporator may be inclined upwardly towards a center of the roof.

Each of the first evaporator and the second evaporator has a plurality of evaporator cores connecting to each other in series, and the first evaporator and the second evaporator may be disposed in series along the longitudinal direction of the vehicle.

The refrigerant distributor may include a distribution flange having a main inlet formed on one portion of the distribution flange for the refrigerant to be introduced therein and branch outlets formed on both ends of the distribution flange. The branch outlets are connected to a first refrigerant inlet of the first evaporator and a second refrigerant inlet of the second evaporator, respectively. A flow control valve is provided rotatably in the distribution flange to vary an opened cross-sectional area in which the main inlet and the branch outlets communicate by rotation of the flow control valve. A motor generates a rotational force for the rotation of the flow control valve. A controller is configured to send an operation signal to the motor according to an operation status of a blower to control the refrigerant distributing through the flow control valve.

The distribution flange may have a main outlet formed on another portion of the distribution flange and separated from the main inlet to circulate the refrigerant introduced via the main inlet in the first evaporator and the second evaporator and to discharge via the main outlet.

If the blower blows air at a rate which exceeds a reference rate, the controller may control the flow control valve to uniformly introduce the refrigerant into the first evaporator and the second evaporator.

If the blower of the air-conditioning device blows air at a rate which exceeds at a reference rate, the controller may control the compressor to provide a higher rotational force, and if the blower blows the air at a rate which is less than the reference rate, the controller may control the compressor to provide a smaller rotational force.

DESCRIPTION OF SPECIFIC EMBODIMENTS

Figure 1A:
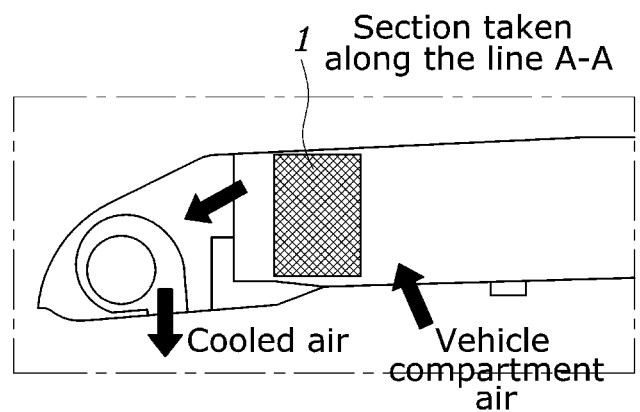
FIGS. 1A and 1B are views for illustrating an actuation principle of an air-conditioning process and an arrangement of an evaporator in a bus according to a conventional art.
Figure 1B:
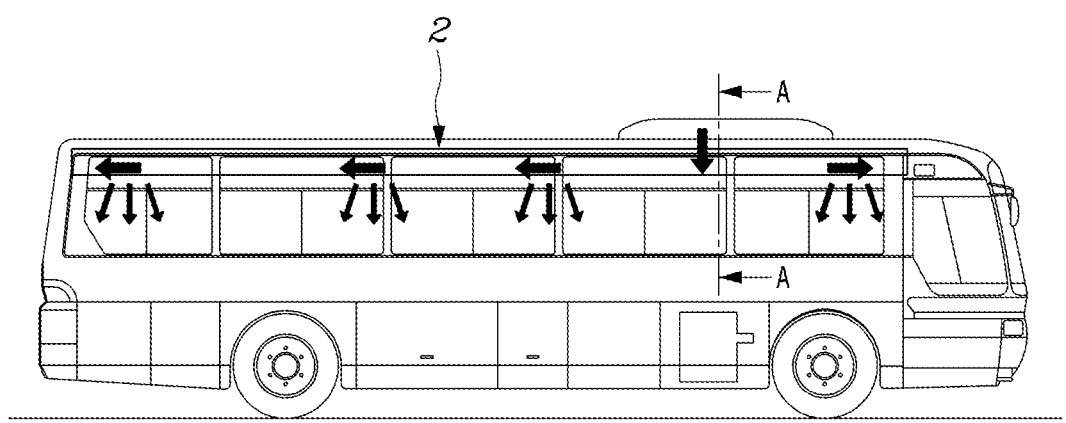

Exemplary embodiments of the present inventive concept will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present inventive concept.

An air-conditioning device for a vehicle according to the present disclosure may include a first evaporator 10, a second evaporator 20, and a refrigerant distributor 100.

Referring to FIGS. 2-5C, the first evaporator 10 and the second evaporator 20 are arranged on a roof 90 of the vehicle in a longitudinal direction of the vehicle.

For example, the first evaporator 10 is provided at a front portion of the vehicle, and the second evaporator 20 is provided at a rear portion of the vehicle.

Figure 2:
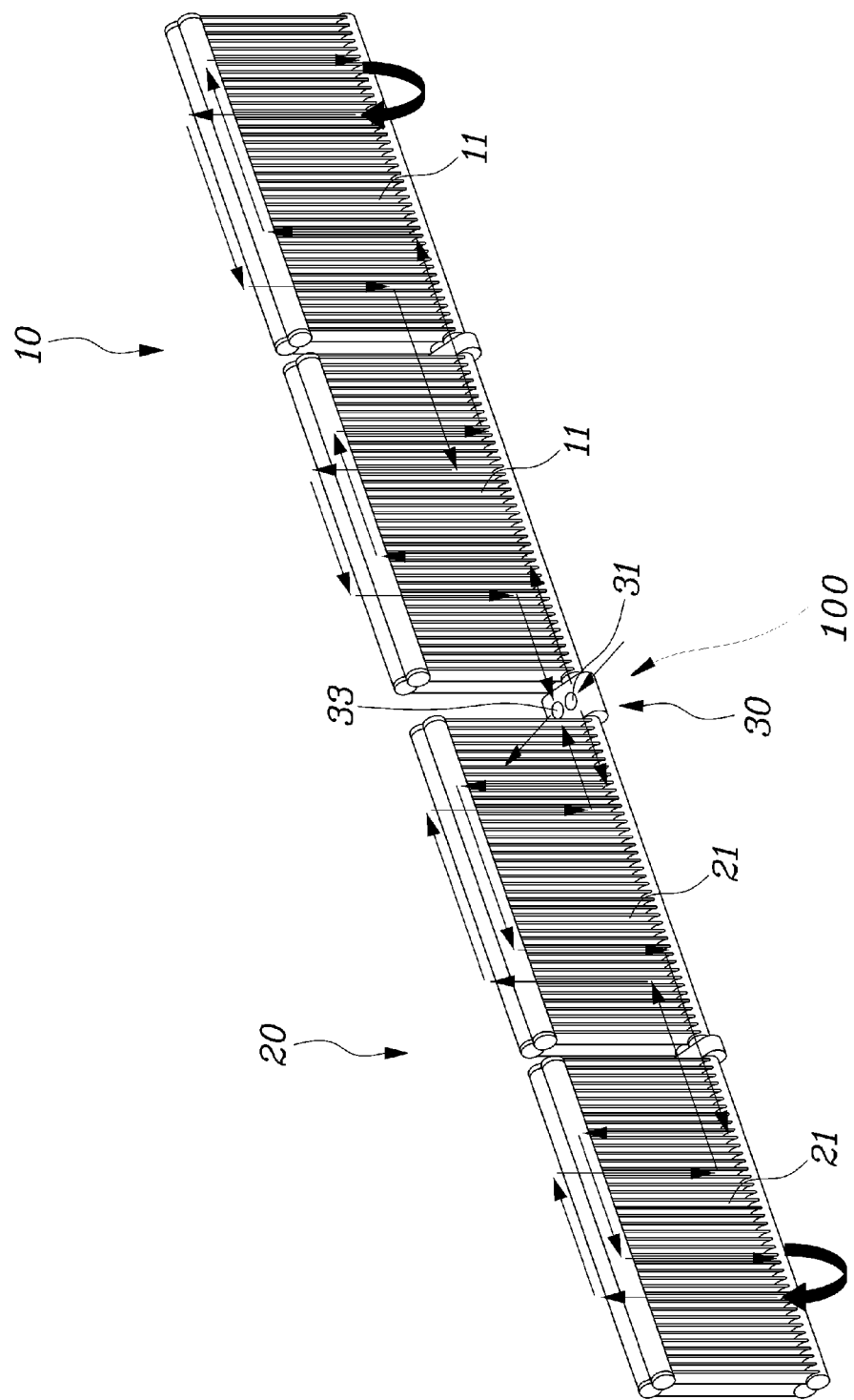
FIG. 2 is a view for illustrating a connection structure of a first evaporator and a second evaporator, and a flow of a refrigerant in an air-conditioning device for a vehicle according to the present disclosure.
Figure 3:
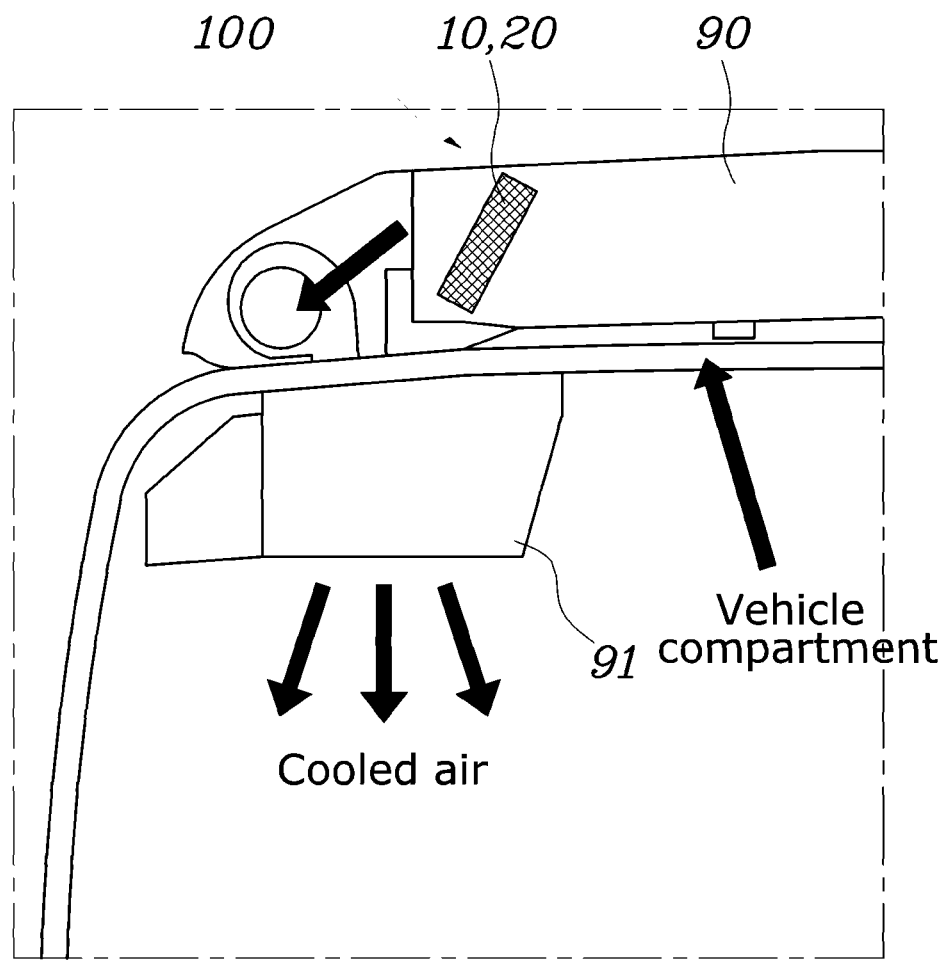
FIG. 3 is a view for illustrating an actuation principle of an air-conditioning process and an arrangement of an evaporator in the air-conditioning device for a vehicle according to the present disclosure.
Figure 4:
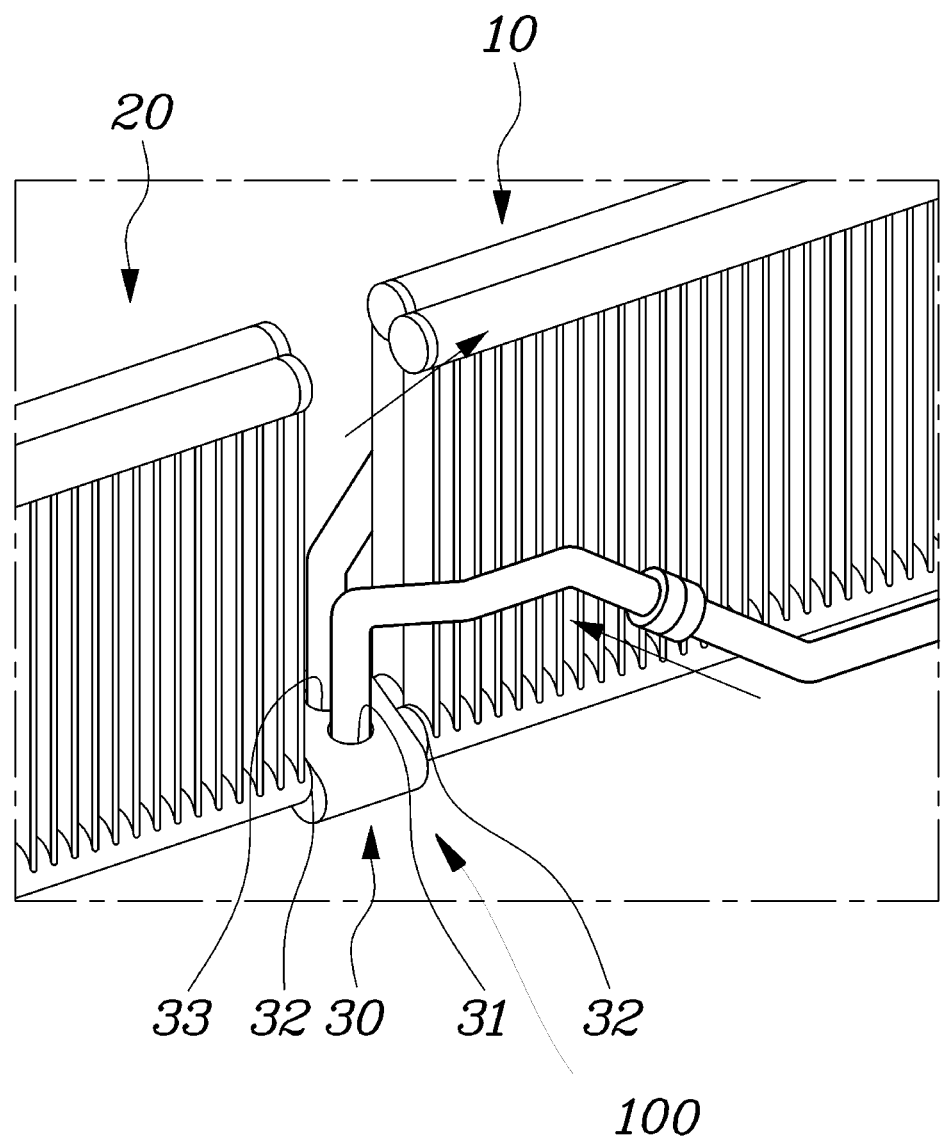
FIG. 4 is an enlarged perspective view of a distribution flange in the air-conditioning device for a vehicle according to the present disclosure.

In other words, as shown in FIGS. 2 and 3, air discharged from a vehicle interior passes through the evaporators 10, 20 and is then cooled. The cooled air is supplied into the vehicle interior via a duct 91 to perform air-conditioning in the vehicle interior. In particular, a front internal space is air-conditioned by the air passing through the first evaporator 10, and a rear internal space may be air-conditioned by the air passing through the second evaporator 20.

In addition, the first evaporator 10 and the second evaporator 20 are provided at both sides of the roof 90, respectively, and upper portions of the first evaporator 10 and the second evaporator 20 may be slantly installed at the roof 90 towards a center of the roof 90.

In other words, each of evaporator cores 11 and 21 used in the first and second evaporators 10 and 21 of the present disclosure includes headers installed at an upper end and a lower end of a tube formed of aluminum, respectively, into and from which a refrigerant is introduced and discharged. Therefore, cooling efficiency is considerably enhanced due to the material characteristic of the evaporator cores 11 and 21 and it is possible to reduce a size of the evaporators 10, 20. Here, since the structure of the evaporator core is well-known in the art, detail description thereon is omitted herein.

When viewed from a front side of the vehicle as shown in FIG. 3, the first evaporator 10 and the second evaporator 20 may be inclined towards one side in the roof 90 such that a height of the vehicle is lowered, and thus, it is possible to prevent an upper surface of the vehicle and the air-conditioning device provided on the roof 90 from being damaged when the vehicle travels under a low ceiling construction.

In addition, a plurality of evaporator cores 11 or 21 are connected to each other in series in the first evaporator 10 or the second evaporator 20 of the present disclosure, and the first evaporator 10 and the second evaporator 20 may be disposed in series along the longitudinal direction of the vehicle.

As shown in FIG. 2, for example, two evaporator cores 11 are connected to each other in series to form the first evaporator 10, two evaporator cores 21 are connected to each other in series to form the second evaporator 20, and the first evaporator 10 and the second evaporator 20 may be then connected to each other in series.

The first evaporator 10 and the second evaporator 20 may be connected to each other via a distribution flange 30 disposed between a connecting portion of lower ends of the first evaporator 10 and the second evaporator 20. The refrigerant introduced into the first evaporator 10 and the second evaporator 20 may be circulated in the first evaporator 10 and the second evaporator 20, and then discharged to and converge in the distribution flange 30. Finally, the refrigerant may flow to a compressor 80.

In the present disclosure, in particular, the refrigerant distributor 100 is provided at a portion at which the refrigerant is branched to the first evaporator 10 and the second evaporator 20. Here, an opening and closing of the refrigerant distributor 100 can be controlled to deliver the refrigerant selectively to the first evaporator 10 and the second evaporator 20.

The refrigerant distributor 100 may include the distribution flange 30, a flow control valve 40, a motor 50, and a controller 60.

The refrigerant distributor 100 is illustrated in detail with reference to FIG. 2 and FIGS. 4-5C. The distribution flange 30 may have a main inlet 31 formed on one side thereof to allow the refrigerant to be introduced thereinto from an expansion valve (not shown) and branch outlets 32 formed on both ends thereof, respectively. Here, since a first refrigerant inlet 12 of the first evaporator 10 and a second refrigerant inlet 22 of the second evaporator 20 are connected to the branch outlets 32, respectively, the refrigerant introduced through the main inlet 31 can be supplied to the first evaporator 10 and the second evaporator 20 via the branch outlets 32 and the first and second refrigerant inlets 12 and 22.

A main outlet 33 may be formed on another side of the distribution flange 30 and branch inlets (not shown) may be formed on both ends of the distribution flange 30. A refrigerant outlet of the first evaporator 10 and a refrigerant outlet of the second evaporator 20 (not shown) are connected to the branch inlets formed on both ends of the distribution flange, respectively, and therefore, the refrigerant circulating in the first evaporator 10 and the second evaporator 20 can flow to the compressor 80 via the refrigerant outlets and the main outlet 33.

Here, a space between the main inlet 31 and the main outlet 33 in the distribution flange 30 is blocked, and a space between the branch outlet 32 and the branch inlet is also blocked.

In addition, the flow control valve 40 is rotatably provided in the distribution flange 30 to adjust partially an opened area, though which the main inlet 31 and the branch outlets 32 communicate, by rotation of the flow control valve 40. The motor 50 may provide a rotational force to the flow control valve 40.

Furthermore, the controller 60 provides the motor 50 with an operation signal according to an operation status of a blower 70 to control the refrigerant branching through the flow control valve 40.

That is, if the blower 70 blows the air exceeding a reference air blowing stage, the controller 60 controls the flow control valve 40 to uniformly supply refrigerant to the first evaporator 10 and the second evaporator 20.

Figure 5A:
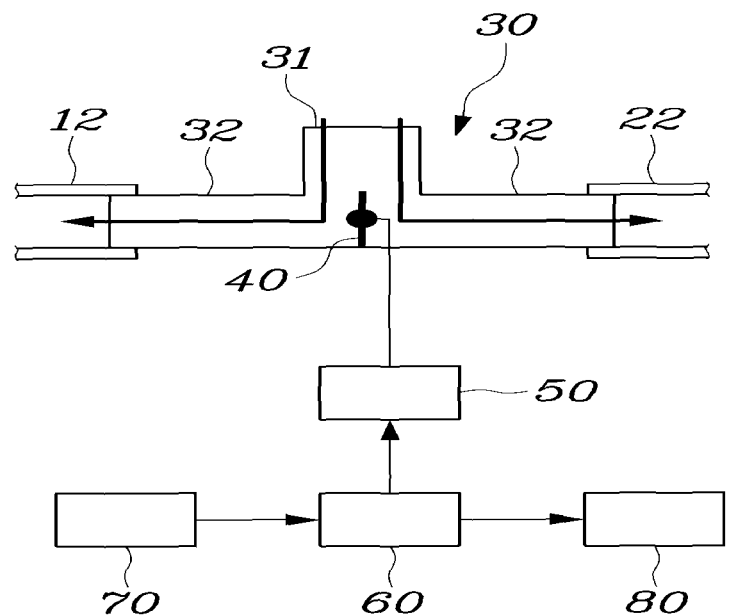
FIGS. 5A-5C are views for illustrating a flow of the refrigerant according to an operation state of a flow control valve in an air-conditioning device according to the present disclosure.

When the air-conditioning device is operated at a high air blowing stage such as 3-stage or 4-stage, the controller 60 controls the flow control valve 40 to allow the refrigerant to be introduced into the first evaporator 10 and the second evaporator 20 as shown in FIG. 5A so that cooled air is supplied to a front area and a rear area of the vehicle interior.

However, the flow control valve 40 may be constructed such that a flow direction of the refrigerant is manually changed to supply the cooled air to only the front area or only the rear area according to a driver's intention when the air-conditioning device is operated at the high air blowing stage.

Figure 5B:
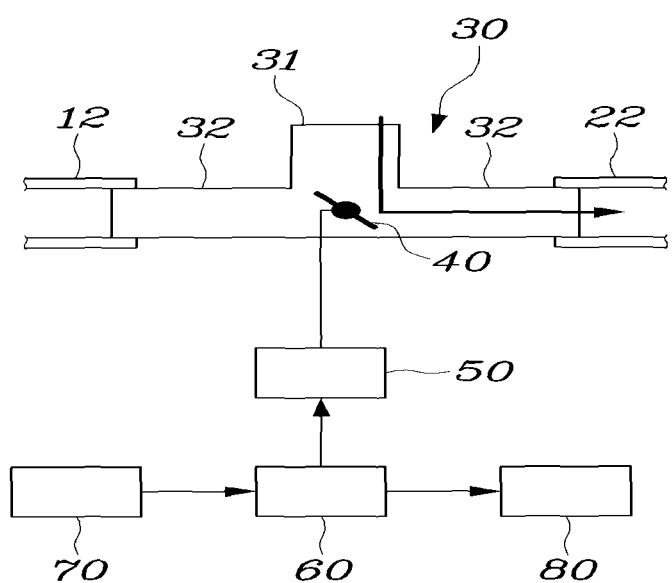
Figure 5C:
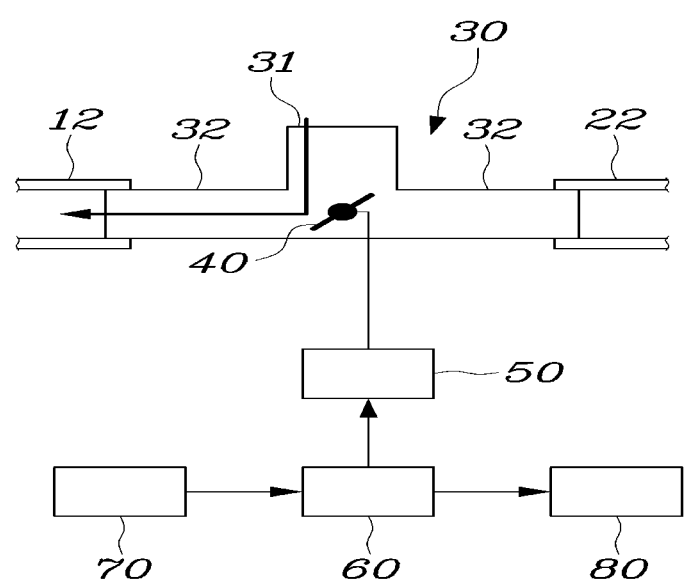

When the air-conditioning device is operated at a low air blowing stage such as 1-stage or 2-stage, the controller 60 may control the flow control valve 40 to allow the refrigerant to be introduced into only any one of the first evaporator 10 and the second evaporator 20 as shown in FIGS. 5B and 5C.

For example, if a number of passengers are found to be in the front area of the vehicle interior, the controller 60 controls the flow control valve 40 to introduce the refrigerant into only the first evaporator 10. Therefore, the cooled air can be supplied into the vehicle around the front area of the vehicle interior. On the contrary, when the passengers are found to be in the rear area of the vehicle interior, the controller 60 controls the flow control valve 40 to introduce the refrigerant into only the second evaporator 20. Therefore, the cooled air can be supplied into the vehicle around the rear area of the vehicle interior.

In particular, if the blower 70 blows the exceeding the reference air blowing stage, the controller 60 controls the compressor 80 to allow all cylinders of the compressor 80 to be operated, and if the blower 70 blows air which is less than the reference air blowing stage, the controller 60 may control the compressor 80 to allow only some of the cylinders of the compressor 80 to be operated.

In other words, if the air-conditioner is operated at 3-stage or 4-stage, the controller 60 operates a solenoid valve (not shown) to allow all the cylinders provided in the compressor 80 to be operated for securing a large quantity of air to be cooled, and if the air-conditioner is operated at 1-stage or 2-stage, the controller 60 releases the operation of the solenoid valve to allow only some of the cylinders provided in the compressor 80 for securing a predetermined quantity of air to be cooled.

Therefore, since when the large quantity of air does not need to be cooled, only some of the cylinders in the compressor 80 are operated, thus reducing power loss of an engine and improving fuel efficiency.

Here, a reciprocating compressor may be employed as the compressor 80 of the present disclosure, and this compressor is well known in the art to which the present disclosure pertains. Therefore, a description on the entire structure and operational principle of the compressor is omitted.

The present disclosure described as above is advantageous in that a refrigerant can be introduced into only any one of the first evaporator and the second evaporator by controlling the flow control valve to selectively cool the front area or the rear area of the vehicle interior, and when a large quantity of air to be cooled is not required, only some of the cylinders of the compressor are operated and power loss of an engine is reduced so that fuel efficiency is improved.

While the present inventive concept has been described with respect to the specific embodiments, it will be apparent to those skilled in the art that various changes and modifications may be made without departing from the spirit and scope of the disclosure as defined in the following claims.

What is claimed is:

1. An air-conditioning device for a vehicle, comprising;
   a first evaporator and a second evaporator disposed on a vehicle roof in a longitudinal direction of the vehicle; and
   a refrigerant distributor provided at a portion at which a refrigerant is supplied to the first evaporator and the second evaporator,
   wherein the refrigerant distributor is disposed between the first evaporator and the second evaporator to introduce the refrigerant selectively into the first evaporator and the second evaporator, and includes a distribution flange having a main inlet and a main outlet being segregated from each other, and
   wherein two branch outlets are formed on both sides of the distribution flange, each of the branch outlets being connected to a first refrigerant inlet of the first evaporator and a second refrigerant inlet of the second evaporator, respectively, such that the refrigerant introduced via the main inlet circulates through the first evaporator and the second evaporator to merge at the distribution flange and then to discharge via the main outlet.

2. The air-conditioning device of claim 1, wherein the first evaporator and the second evaporator are provided at left and right sides of the roof, respectively, and upper portions of the first evaporator and the second evaporator are inclined upwardly towards a center of the roof.

3. The air-conditioning device of claim 1, wherein each of the first evaporator and the second evaporator has a plurality of evaporator cores connecting to each other in series, and the first evaporator and the second evaporator are disposed in series along the longitudinal direction of the vehicle.

4. The air-conditioning device of claim 1, wherein the refrigerant distributor comprises:
   a distribution flange having a main inlet formed on one portion of the distribution flange for the refrigerant to be introduced therein and branch outlets formed on both ends of the distribution flange, the branch outlets being connected to a first refrigerant inlet of the first evaporator and a second refrigerant inlet of the second evaporator, respectively;
   a flow control valve provided rotatably in the distribution flange to vary an opened cross-sectional area in which the main inlet and the branch outlets communicate by rotation of the flow control valve;
   a motor generating a rotational force for the rotation of the flow control valve; and
   a controller configured to send an operation signal to the motor according to an operation status of a blower to control the refrigerant distributing through the flow control valve.

5. The air-conditioning device of claim 4, wherein the distribution flange has a main outlet formed on another portion of the distribution flange and separated from the main inlet to circulate the refrigerant introduced via the main inlet in the first evaporator and the second evaporator and to discharge via the main outlet.

6. The air-conditioning device of claim 4, wherein, if the blower blows air at a rate which exceeds a reference rate, the controller controls the flow control valve to uniformly introduce the refrigerant into the first evaporator and the second evaporator.

7. The air-conditioning device of claim 4, wherein if the blower blows air at a rate which exceeds the reference rate, the controller controls the compressor to provide a higher rotational force, and if the blower blows the air at a rate which is less than the reference rate, the controller controls the compressor to provide a smaller rotational force.

* * * * *